June 4, 1968 R. W. STOFFEL ETAL 3,387,142
NAN CIRCUIT
Filed March 2, 1965
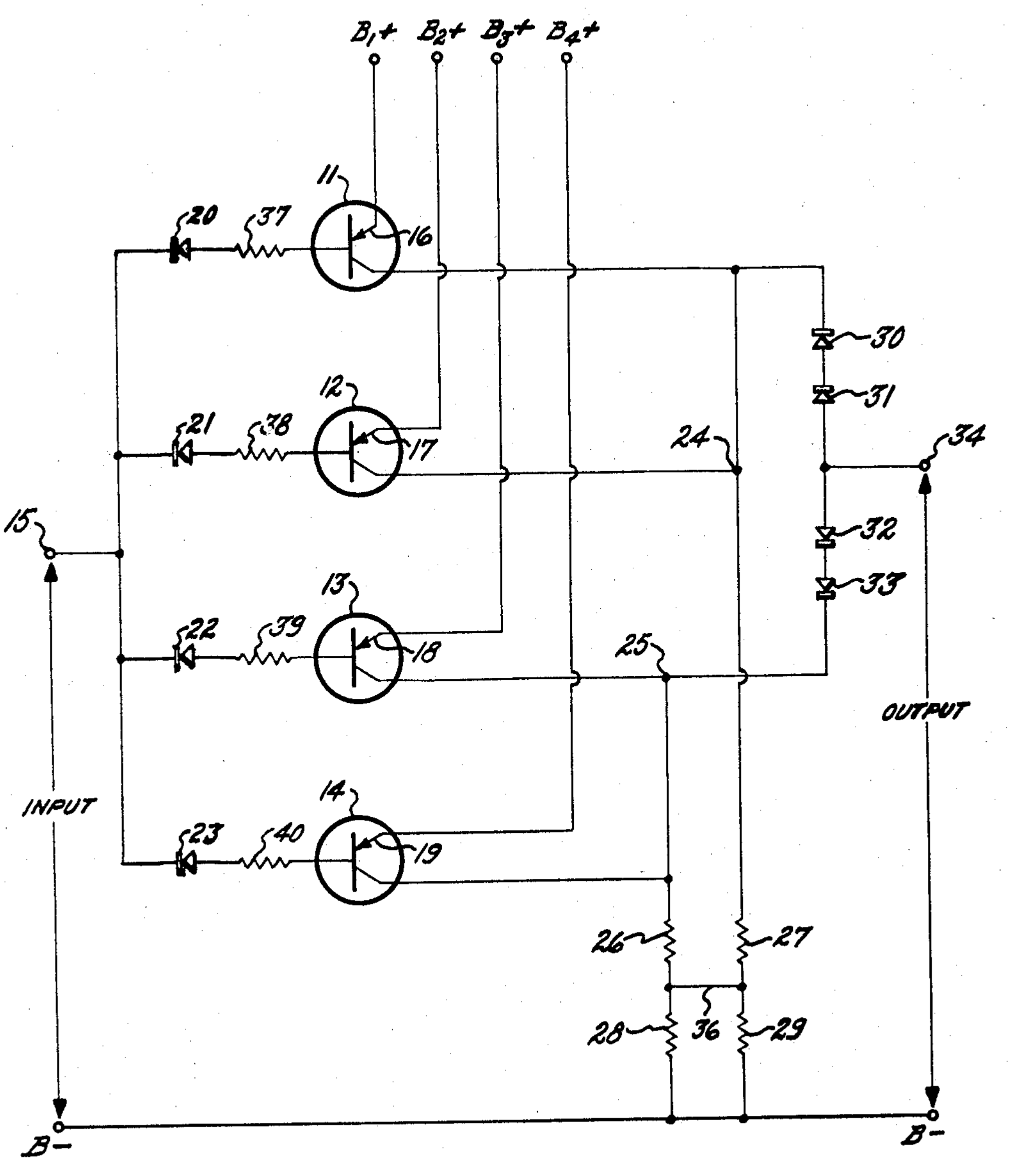
INVENTORS
ROBERT W. STOFFEL
JEROME S. VANUSE
ROBERT C. PAGE
BY Harry A. Herbert Jr. and George Fine
ATTORNEYS 3,387,142

NAN CIRCUIT

Robert W. Stoffel, Englewood, Colo., Jerome S. Janusz, Huntsville, Ala., and Robert C. Pace, Dallas, Tex., assignors to the United States of America as represented by the Secretary of the Air Force Filed Mar. 2, 1965, Ser. No. 436,703
1 Claim. (Cl. 307—215)

ABSTRACT OF THE DISCLOSURE

A redundant NAN with two pairs of parallel transistors and having diodes in the input and redundant diodes in the output, the circuit remaining operative in the event of either a transistor short or open.

This invention relates to NAN circuits and, more particularly, to NAN circuits having an unusually high degree of reliability.

A related application is being filed on the same date herewith which discloses a NOR circuit.

The conventional approach to the mechanization of a digital computer requires the embodiment of a large quantity of standardized transistorized modules in combination much like links in a chain. A reliability problem arises in that the failure of a single component part will disable the entire computer. Since the probability of successful operation of the computer diminishes exponentially with the quantity of component parts utilized, a circuit has been devised to minimize the sensitivity of digital computers to individual failures of transistors, diodes or resistors. Potential application of this invention includes digital computers in the business machine as well as aerospace fields.

It is therefore an object of this invention to provide a NAN circuit for use in digital computers.

It is another object of this invention to provide a NAN circuit for use in digital computers where the failure of a component will not disable the computer.

It is still another object to provide a method of testing a NAN circuit to insure functioning of all circuit elements.

It is yet another object to provide a method of testing a combination of NAN circuits to insure functioning of all circuit elements in the combination.

These and other advantages, features and objects of the invention will become more apparent from the following description taken in connection with the illustrative embodiments in the accompanying drawing which shows a circuit diagram showing an embodiment of this invention.

The invention is an electronic logic circuit which is totally insensitive to failure as a module in the event a component part fails from any cause. In general the circuit consists of two pairs of two PNP transistors with the base of each transistor isolated from a common input terminus by a resistor and a forward biased diode. The diodes prevent circuit malfunction in the event of a transistor collector-to-base short, while the resistors provide current limiting and are selected to be compatible to the transistor base-to-emitter current ratings.

The collectors of each pair of transistors are joined and isolated from a common output terminus through a series pair of forward biased diodes and isolated from a negative voltage buss through a resistor. The negative voltage buss in turn is isolated from separate negative voltage supplies through separate resistors. The emitter of each transistor can be isolated to permit a functional test of each transistor or when this circuit is operational as a NAN circuit the emitters are joined and returned to a positive voltage supply.

Referring to the single drawing of the present invention in detail, the circuit will be first explained when the circuit functions in the absence of a component part failure. With positive and equal supply voltages applied to $B_1$ plus, $B_2$ plus, $B_3$ plus, and $B_4$ plus and with a small voltage presented to terminal 15 with respect to B minus and with emitters 16, 17, 18 and 19 of transistors 11, 12, 13 and 14 joined to $B_1$ plus, $B_2$ plus, $B_3$ plus, and $B_4$ plus, diodes 20, 21, 22 and 23, respectively, will be forward biased sufficiently to raise the voltage at points 24 and 25 to that approximating the potential represented by B plus. Resistors 37, 38, 39 and 40 are used for current limiting. The total supply voltage, except for a small increment proportional to the product of the equivalent saturation resistance of the transistors and the total collector-emitter current, will appear across the resistors 26, 27, 28 and 29. Resistors 26 and 27 are connected to points 24 and 25, respectively, and at their opposite ends are connected in common at point 36. Resistors 28 and 29 are connected to point 36 and to B minus. Excessive voltage at points 24 and 25, prevent the forward biasing of diodes 30 and 31 or 32 and 33 and, consequently, excessive voltage is presented to the output terminals 34 and B minus to turn off succeeding circuits. In the presence of a high voltage at terminal 15, the voltage at point 24 and 25 will drop toward B minus. The diode pairs 30, 31 and 32, 33 will be forward biased and a low voltage will be presented at the output terminals 34 and B minus to turn on succeeding circuits. The diode pairs 30, 31 or 32, 33 are utilized in a redundant series configuration to minimize the probability of a failure of this circuit resulting from a shorted output whenever several of these circuits are joined to a common input.

From the preceding discussion, it is apparent that the input voltage is inverted. A low input voltage results in a high output voltage. Using the convention that low voltages are zero signals and high voltages are plus signals, the output of the circuit will be zero only if all the input signals are plus. Likewise, the output will be plus if any one of the input signals is zero.

The circuit is now described in the event of a collector-to-emitter open of a transistor. Transistor 11, which is selected arbitrarily, is paralled by transistor 12. With a low input voltage at terminal 15, voltage at point 24 will rise toward B plus by virtue of the collector-to-emitter current shunted through transistor 12. Circuit performance remains undisturbed since the output voltage between terminals 34 and B minus remains sufficiently high. From the foregoing, it is apparent that any one of the four transistors or combination of transistors 11 and 13, 11 and 14, 12 and 13, or 12 and 14 may fail open without resulting in a failure of this circuit.

In the event of a collector-to-emitter short in transistor 11, there will be a voltage rise at point 24 toward B plus; however, when transistors 13 and 14 function, the voltage at point 25 will drop toward B minus. A low impedance therefore will appear at the output terminals 34 with respect to B minus with diodes 30, 31 back-biased. Hence, any one of the four transistors 11, 12, 13 or 14 or combination of transistors 11 and 12 or 13 and 14 may fail due to a short without resulting in a failed circuit. In the absence of a transistor failure any single diode or resistor may fail either open or shorted without resulting in a failure of this circuit.

As an approximation the following equation may be written describing the probability of success of this circuit performance in terms of the probabilities of failure of the several component parts:

where:

$$P=1-2a^2-4ab-4cd-8af-2e^2-4bf-2b^2-2g^2-4eh-2i^2-4f^2-2h^2-4aj-4j^2-4ei-4hi$$

where:

$P$=probability of successful performance of the circuit
$a$=probability of a transistor short, collector-to-emitter
$b$=probability of any one of resistors 26, 27, 28 or 29 being open
$c$=probability of any one of diodes 20, 21, 22 or 23 being shorted
$d$=probability of a transistor short, collector-to-base
$e$=probability of any one of resistors 37, 38, 39 or 40 being open
$f$=probability of any one of diodes 30, 31, 32 or 33 being open
$g$=probability of any one of diodes 30, 31, 32 or 33 being shorted
$h$=probability of any one of diodes 20, 21, 22 or 23 being open
$i$=probability of a transistor open, collector-to-emitter
$j$=probability of any one of resistors 26, 27, 28 or 29 being shorted All terms involving three or more failures have been omitted from the equation since their effect on P is negligible.

A calculation based on typical component constant part failure rates indicates that this NAN circuit has a lesser propensity for failure than its conventional transistorized counter-part by a factor of 1500, when both are operated for a period of 10,000 hours, or by factor of 15,000 when both are operated for a period of 1000 hours. It therefore becomes expedient to mechanize digital computers with this type of NAN circuit when even a high degree of assurance is required that the digital computer will not undergo failure.

Unlike existing NAN circuits employing redundancy the emitter of each transistor in the present invention can be isolated and returned individually to the positive supply voltage terminal B plus. Emitters 16, 17, 18, and 19 may be connected individually to the positive supply voltage. This provision permits a function test of each transistor and its associated circuitry for the purpose of detecting failed parts within this circuit. With assurances that no parts have failed, the full potential of this circuit for failure free operation can then be realized in use. A combination of these circuits with single or multiple inputs or outputs may be tested in a similar manner by establishing four separate terminals for the connection of transistor emitter leads. Thus, emitter 16 of each transistor 11 in each of the circuits is connected to a first terminal. Emitter 17 of each transistor 12 in each circuit is connected to a second terminal. Emitter 18 of transistor 13 is connected to a third terminal and emitter 19 of transistor 14 is connected to a fourth terminal. Upon application of a signal to the input of the combination with each terminal connected in turn to the positive supply voltage, B plus full assurance is obtained that no parts have failed in any of the circuits of the combination.

Each diode, resistor and power supply in this circuit can in turn be made redundant, thereby further decreasing the sensitivity of this circuit to failure.

Although the invention has been described with reference to a particular embodiment, it will be understood to those skilled in the art that the invention is capable of a variety of alternative embodiments within the spirit and scope of the appended claim.

We claim:

1. A NAN circuit comprising: two pairs of PNP transistors each transistor having a base, emitter and collector, the pairs of transistors being in parallel arrangement and the collectors of each of the pairs joined at two common points; four sources of supply voltage, each source having the same voltage level, having positive terminals connected one each to the collectors and having a common negative terminal; a network of resistors connected between the negative terminal of the four sources of supply voltage and the two common points, the network including a first and second resistor connected to the negative terminal with the opposite ends of the resistors being connected in common, a third resistor and fourth resistor connected to the first and second resistors with the opposite ends thereof being connected to the two common points; a first and second means for controlling the direction of current connected to each of the two common points, the output of the circuit being defined by a point interposed between the first and second means and the negative terminal of the source of supply voltage; and a plurality of diodes each connected to each base of the transistors and connected at the opposite end to a common terminal, the common terminal and the negative terminal of the source of supply voltage defining the input of the circuit.

References Cited

UNITED STATES PATENTS

| | | | |
|---|---|---|---|
| 2,891,172 | 6/1959 | Bruce et al. | 307—88.5 |
| 2,891,172 | 6/1959 | Bruce et al. | 307—88.5 |
| 2,962,604 | 11/1960 | Brittain | 307—88.5 |
| 3,058,007 | 10/1962 | Lynch | 307—88.5 |
| 3,191,057 | 6/1965 | Feng | 307—88.5 |
| 3,201,701 | 8/1965 | Maitra | 307—88.5 |

OTHER REFERENCES

Redundant Circuit Design by Goldstein, EEE, April 1963, pages 79–82.

ARTHUR GAUSS, *Primary Examiner.*

H. DIXON, *Assistant Examiner.*